(12) United States Patent
Serricchio et al.

(10) Patent No.: US 10,662,978 B2
(45) Date of Patent: May 26, 2020

(54) HYDRAULIC NO-BACK DEVICE

(71) Applicant: Microtecnica S.r.l., Turin (IT)

(72) Inventors: Vincenzo Serricchio, Turin (IT); Andrea Mornacchi, Turin (IT); Domenico Tafuni, Turin (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 16/137,957

(22) Filed: Sep. 21, 2018

(65) Prior Publication Data

US 2019/0203743 A1    Jul. 4, 2019

(30) Foreign Application Priority Data

Dec. 29, 2017  (EP) ..................................... 17211099

(51) Int. Cl.
| | | |
|---|---|---|
| F15B 13/01 | (2006.01) | |
| F15B 20/00 | (2006.01) | |
| F15B 11/00 | (2006.01) | |
| F15B 11/10 | (2006.01) | |
| F15B 13/02 | (2006.01) | |

(Continued)

(52) U.S. Cl.
CPC ............ *F15B 13/01* (2013.01); *F15B 11/003* (2013.01); *F15B 11/10* (2013.01); *F15B 13/027* (2013.01); *F15B 13/0426* (2013.01); *F15B 20/00* (2013.01); *F15B 20/004* (2013.01); *F16K 31/122* (2013.01); *F15B 13/0407* (2013.01); *F15B 2211/30505* (2013.01); *F15B 2211/30515* (2013.01); *F15B 2211/329* (2013.01); *F15B 2211/355* (2013.01); *F15B 2211/40507* (2013.01); *F15B 2211/6355* (2013.01); *F15B 2211/7053* (2013.01); *F15B 2211/7054* (2013.01); *F15B 2211/8633* (2013.01); *F15B 2211/8752* (2013.01)

(58) Field of Classification Search
CPC ...... F15B 11/003; F15B 13/01; F15B 13/015; F15B 13/0426; F15B 20/00
USPC ..................................... 91/420, 445; 60/406
See application file for complete search history.

(56) References Cited

U.S. PATENT DOCUMENTS 2,618,121 A * 11/1952 Tucker .................... F15B 13/01
                                                               91/420
3,273,467 A    9/1966 Allen
(Continued)

OTHER PUBLICATIONS

Extended European Search Report for International Application No. 17211099.1 dated Jun. 8, 2018, 9 pages.
(Continued)

*Primary Examiner* — Michael Leslie
(74) *Attorney, Agent, or Firm* — Cantor Colburn LLP

(57) ABSTRACT

A system for moving a hydraulic actuator that uses the new type of hydraulic no-back device. In some examples, the system comprises: a hydraulic power module for pumping hydraulic fluid through the system to the actuator, a reservoir for receiving said fluid back from said system and said actuator, first and second check valves; a conduit or conduits for fluidly connecting said power module to said check valves and said reservoir; and wherein said conduit or conduits are connected so as to allow said hydraulic fluid to flow from the hydraulic power module to said first check valve, and from said first check valve into said hydraulic actuator, and from said hydraulic actuator to said second check valve and from said second check valve to said reservoir.

8 Claims, 5 Drawing Sheets

(51) Int. Cl.
*F15B 13/042* (2006.01)
*F16K 31/122* (2006.01)
*F15B 13/04* (2006.01)

(56) References Cited

U.S. PATENT DOCUMENTS

| | | | |
|---|---|---|---|
| 4,286,432 A * | 9/1981 | Burrows | F15B 13/01 |
| | | | 60/404 |
| 4,718,329 A * | 1/1988 | Nakajima | E02F 9/2203 |
| | | | 91/445 |
| 5,575,150 A | 11/1996 | Vieten et al. | |
| 6,131,610 A * | 10/2000 | Morisako | F15B 13/01 |
| | | | 137/601.19 |
| 8,973,869 B2 | 3/2015 | Onomichi et al. | |
| 9,068,322 B2 * | 6/2015 | Park | F15B 13/015 |
| 2004/0112208 A1 | 6/2004 | Kot, II | |
| 2007/0199437 A1 | 8/2007 | Sakai et al. | |
| 2016/0098045 A1 | 4/2016 | Ito | |

OTHER PUBLICATIONS

Rubinger, Bruno, "Electrohydraulic Utility Arm Inspects Underground Tanks", Hydraulic and Pneumatics, Penton Media, Cleveland, OH, US, vol. 52, No. 1, Jan. 1, 1999, 2 pages.

* cited by examiner

HYDRAULIC NO-BACK DEVICE

FOREIGN PRIORITY

This application claims priority to European Patent Application No. 17211099.1 filed Dec. 29, 2017, the entire contents of which is incorporated herein by reference.

TECHNICAL FIELD

The present disclosure relates to hydraulic actuator systems and in particular, systems that utilise a no-back device as a safety device in a hydraulic system.

BACKGROUND

Hydraulic actuators are widely used in aircraft and ground-based vehicles. In aircraft, hydraulic actuators are commonly used to actuate the primary and secondary flight control surfaces of the aircraft that shape the airflow around the aircraft so as to maneuver it. Hydraulic pumps are usually used to pump hydraulic fluid through conduits to the actuator so as to move the control surface in one direction or another, as desired. During flight, control surfaces, both primary and secondary, are subjected to significant aerodynamic loads as a function of aircraft speed, wind magnitude and surface position. In normal operating conditions the external force is equilibrated by the hydraulic force. However, as a result of the failure of one or more hydraulic systems present in the aircraft, external forces may no longer be compensated for. The aerodynamic forces, no longer countered effectively, can cause uncontrolled surface oscillations which could lead to loss of aircraft control. A safety no-back device prevents uncontrolled movement of the actuator (and thereby, the control surface) in case of hydraulic system failure. Conventional no-back devices have generally been considered satisfactory for their intended purpose however it is desirable to improve these in terms of performance, efficiency, size, and weight.

SUMMARY

A hydraulic no-back device is described herein. In particular, the disclosure provides a system comprising a no-back device, the system being for moving a hydraulic actuator comprising: a hydraulic power module for pumping hydraulic fluid through the system to the actuator, a reservoir for receiving the fluid back from the system and the actuator, first and second check valves; a conduit or conduits for fluidly connecting the power module to the check valves and the reservoir; and wherein the conduit or conduits are connected so as to allow the hydraulic fluid to flow from the hydraulic power module to the first check valve, and from the first check valve into the hydraulic actuator, and from the hydraulic actuator to the second check valve and from the second check valve to the reservoir.

In any of the examples described herein, the hydraulic actuator may comprise first and second fluid chambers; and wherein the conduit or conduits are connected so as to allow the hydraulic fluid to flow from the first check valve to the fluid chamber and from the second fluid chamber to the second check valve.

In any of the examples described herein, the first and second check valves may comprise hydraulic pilot operated no-back devices.

In any of the examples described herein, the first and/or second check valves may comprise a housing having a first chamber and a second chamber, and a chamber port provided between the first and second chamber; and wherein the first chamber has a pilot piston movably located within the first chamber; and wherein when the pilot piston is provided in a first position within the first chamber, the chamber port is closed, and wherein when the pilot piston is in a second position, the chamber port is open.

In any of the examples described herein, the first chamber may further comprise a pilot port C for receiving fluid from the supply and a vent port V, and the housing may comprise a control port A in fluid communication with the chamber port and wherein the second chamber comprises an actuator chamber port P.

In any of the examples described herein, in normal operation, the vent ports V of the first and second check valves guarantee an identical pressure in both vent ports V that is always equal to the half difference between a supply and return pressure within the hydraulic system.

In any of the examples described herein, when the pilot piston is in the first position and the chamber port is closed, the fluid may be able to flow out of the vent port V of the first, pilot piston chamber, and fluid flow may be prevented from flowing between the control port A and the actuator chamber port P.

In any of the examples described herein, when the pilot piston is in the second position and the chamber port is open, fluid is able to flow between the control port A and the actuator chamber port P and vice versa In any of the examples described herein, the vent port V of the first check valve may be fluidly connected to the vent port V of the second check valve.

In any of the examples described herein, the vent port V of the first check valve may be fluidly connected to the control port A of the first check valve via a restrictor orifice.

In any of the examples described herein, the vent port V of the second check valve may be fluidly connected to the control port A of the second check valve via a restrictor orifice.

In any of the examples described herein, each check valve may comprise: a control port A in selective fluid communication with the power module and/or the reservoir, an actuator chamber port P in fluid communication with a chamber of the hydraulic actuator; and a movable shutter for selectively preventing fluid flow between the control port A and the actuator chamber port P.

In any of the examples described herein each check valve may have substantially cylindrical geometry; and in each check valve, a generally cylindrical chamber may connect a control port C to an actuator chamber port P, the cylindrical chamber having a chamber diameter, and wherein the pilot piston has a diameter, wherein the chamber diameter is within 10% of the piston diameter.

In the examples described herein, the check valves have the advantage that they guarantee the opening of the check valves (e.g. hydraulic pilot operated no-back devices), irrespective of the ratio between the pressure of the control port C and the chamber pressure P

DESCRIPTION OF THE FIGURES

Certain embodiments of the present disclosure will now be described in greater detail by way of example only and with reference to the accompanying drawings in which.

DETAILED DESCRIPTION

Figure 1:
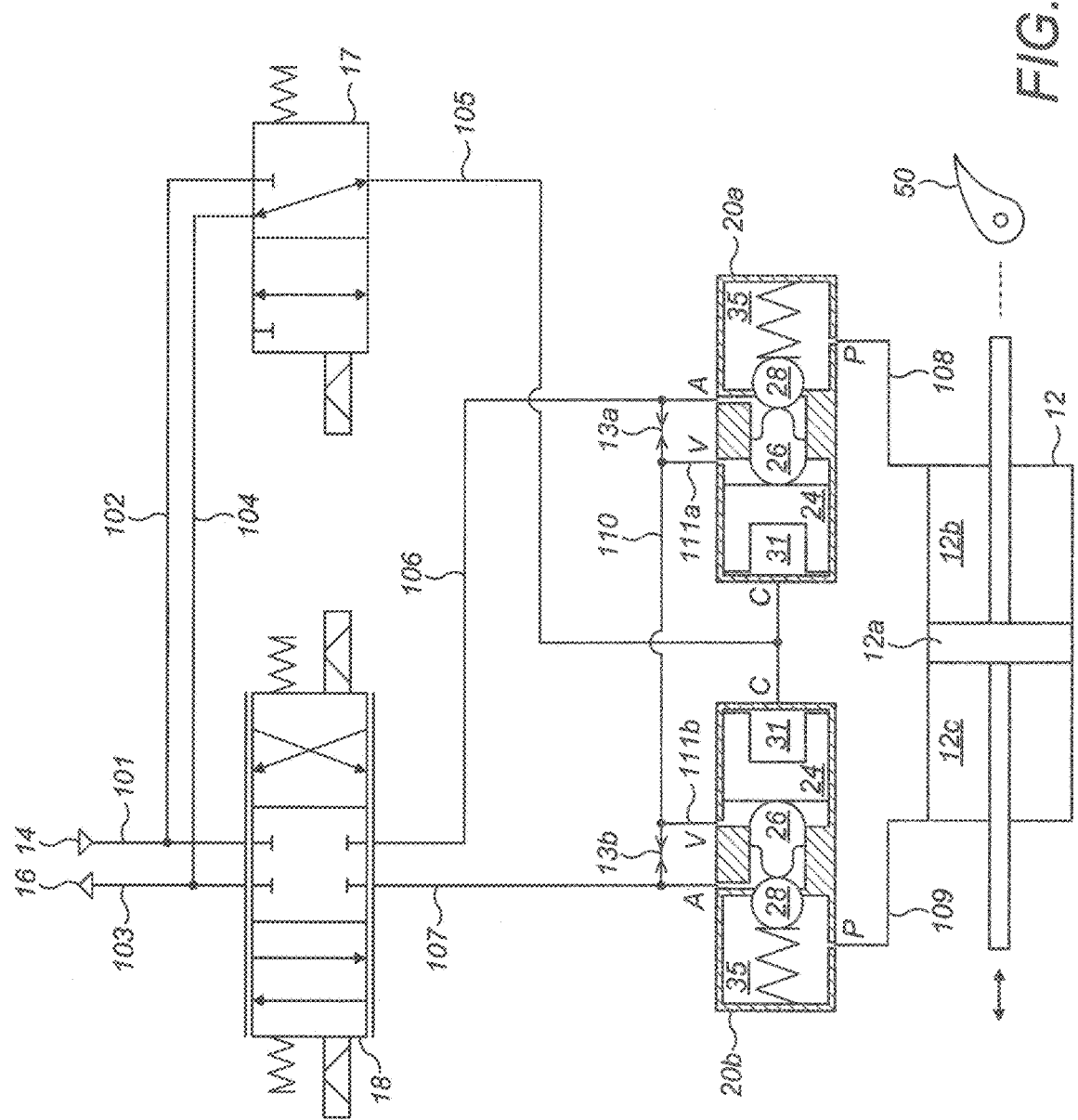
FIG. 1 shows a hydraulic arrangement for driving a hydraulic actuator.

FIG. 1 shows an arrangement 10 for controlling a hydraulic actuator 12. By controlling a servovalve 18 and a solenoid valve 17, the arrangement 10 can cause the hydraulic actuator 12 to move its piston 12a to the right or to the left in the orientation shown in FIG. 1. The motive power for the actuator 12 comes from a hydraulic supply 14, such as a pump. Movement of the piston 12a can in turn move a flight control surface, such as a flap 50, of an aircraft.

As is known in the field of aircraft, the flight control surface 50 may be subject to significant aerodynamic loads during flight. The aerodynamic forces can result, in case of failure of hydraulic system connected to the surface actuator 12, in uncontrolled flight control surface oscillations which could lead to loss of aircraft control. In the event of a failure, a hydraulic no-back device can counteract the external forces by preventing the movement of the fluid present in the two chambers of the actuator 12. The (incompressible) fluid, thus contained, increases in pressure until the load acting on the surface is balanced.

The present disclosure therefore relates to a new type of hydraulic arrangement 10 comprising an actuator 12 that may be connected to a flight control surface, e.g. flap 50. The arrangement 10 requires the installation of a specific no-back device, described below, to prevent feedback forces from moving the flap 50 in the event of hydraulic system failure.

The arrangement 10 shown in FIG. 1 comprises a hydraulic supply 14 connected via a supply line 101 (or "conduit") to the hydraulic servovalve 18, and to a solenoid valve 17 via a second line 102 that branches off the supply line 101. A third line 103 and its branch 104 (fourth line 104) connect the servovalve 18 and the solenoid valve 17, respectively, to the hydraulic return 16. A fifth line 105 connects the solenoid valve 17 to pilot ports C of two hydraulic no-back devices (i.e. pilot-operated check valves) 20a, 20b. A sixth line 106 and seventh line 107 connect the servovalve 18 to the respective control ports A of the hydraulic no-back devices 20a and 20b. An eighth line 108 connects the first hydraulic no-back device 20a to the retraction chamber 12b of the hydraulic actuator 12. A ninth line 109 connects the extension chamber 12c of the hydraulic actuator 12 to the second hydraulic no-back device 20b. A tenth line 110 connects between the sixth 106 and seventh 107 lines. The tenth line has two branches 111a and 111b that connect respectively the tenth line 110 to vent ports V of the hydraulic no-back devices 20a, 20b.

The solenoid valve 17 may be a standard three-way valve having two positions. In a first position fluid from the hydraulic supply 14 is prevented while fluid may flow from the ports C of the hydraulic no-back devices to the return 16 (as shown in FIG. 1). In a second position fluid may flow from the hydraulic supply 14 to the fifth line 105, so that pilot ports C of the hydraulic no-back devices 20a, 20b are therefore connected to the supply 14.

The servovalve 18 may be a standard 4-ways servovalve; the flow rates generated by the servovalve 18 and directed from or to the actuator chambers 12b, 12c are proportional to the command current.

Each hydraulic no-back device 20a, b comprises a pilot port C, a vent port, V, an actuator chamber port P and a control port, A. The pilot port C is connected via a conduit or conduits to the solenoid valve as described above. Therefore, in normal operation, the solenoid valve 17 may connect the ports C of both the hydraulic pilot no-back devices (20a and 20b) to the supply 14 and the pressure from the supply 14 causes the hydraulic pilot no-back devices 20a, 20b to open so as to allow fluid to flow into/out of the actuator 12.

Figure 3:
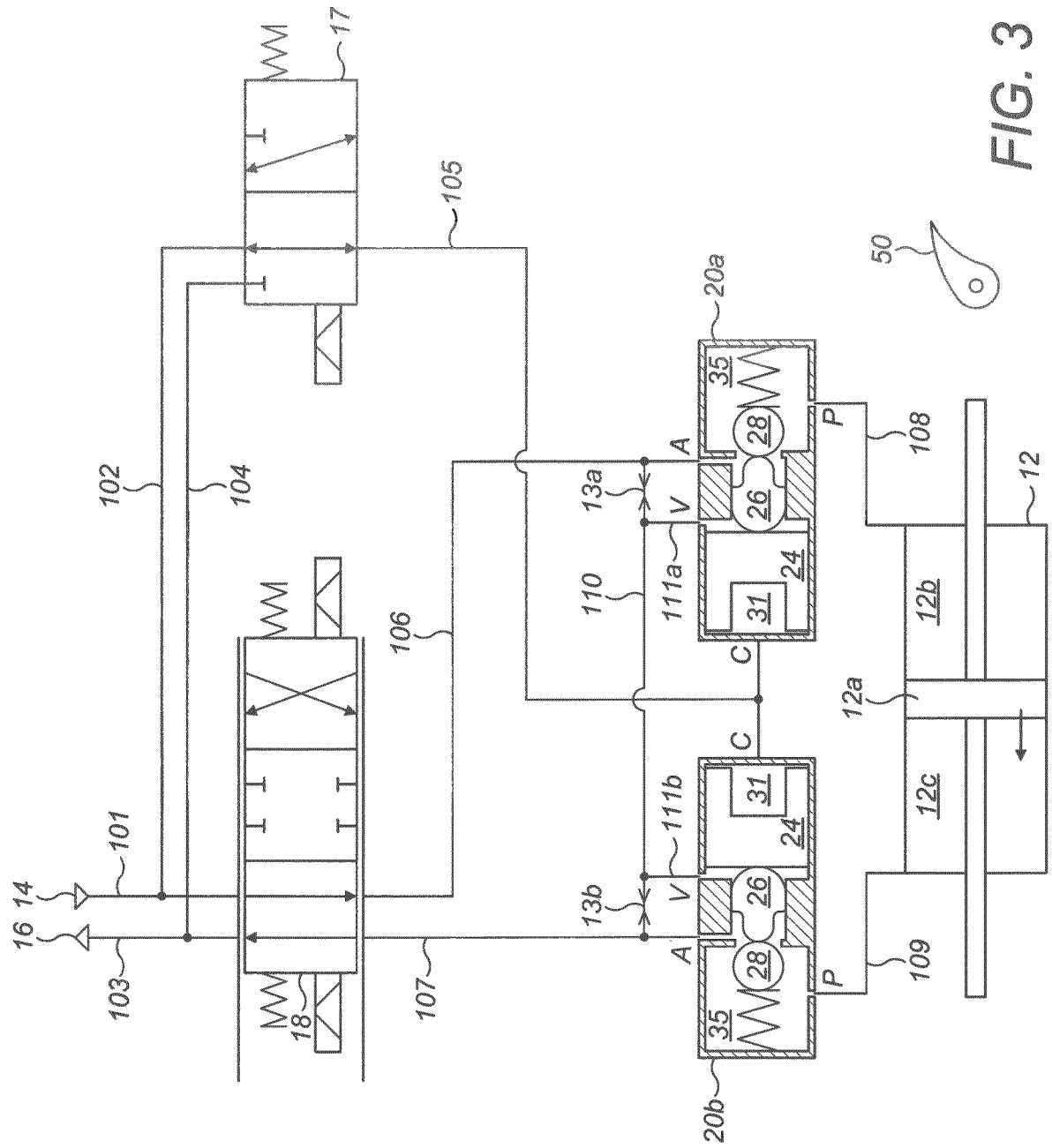
FIG. 3 shows the arrangement of FIG. 1 in position to drive the actuator piston to the left.

When the hydraulic pilot no-back devices 20a, 20b are thus opened, then to extend the piston 12a of the hydraulic actuator 12 (in the left direction), a positive command current shall be provided to the servovalve 18 to cause a displacement of the spool of the servovalve 18 to the position shown in FIG. 3. This results in flow from the supply 14 to the actuator chamber 12b via the sixth line 106, the first hydraulic no-back device 20a, and the eighth line 108. At the same time, the servovalve 18 allows flow from the actuator chamber 12c to the return 16 via ninth line 109, the second hydraulic no-back device 20b, and the seventh line 107.

Figure 4:
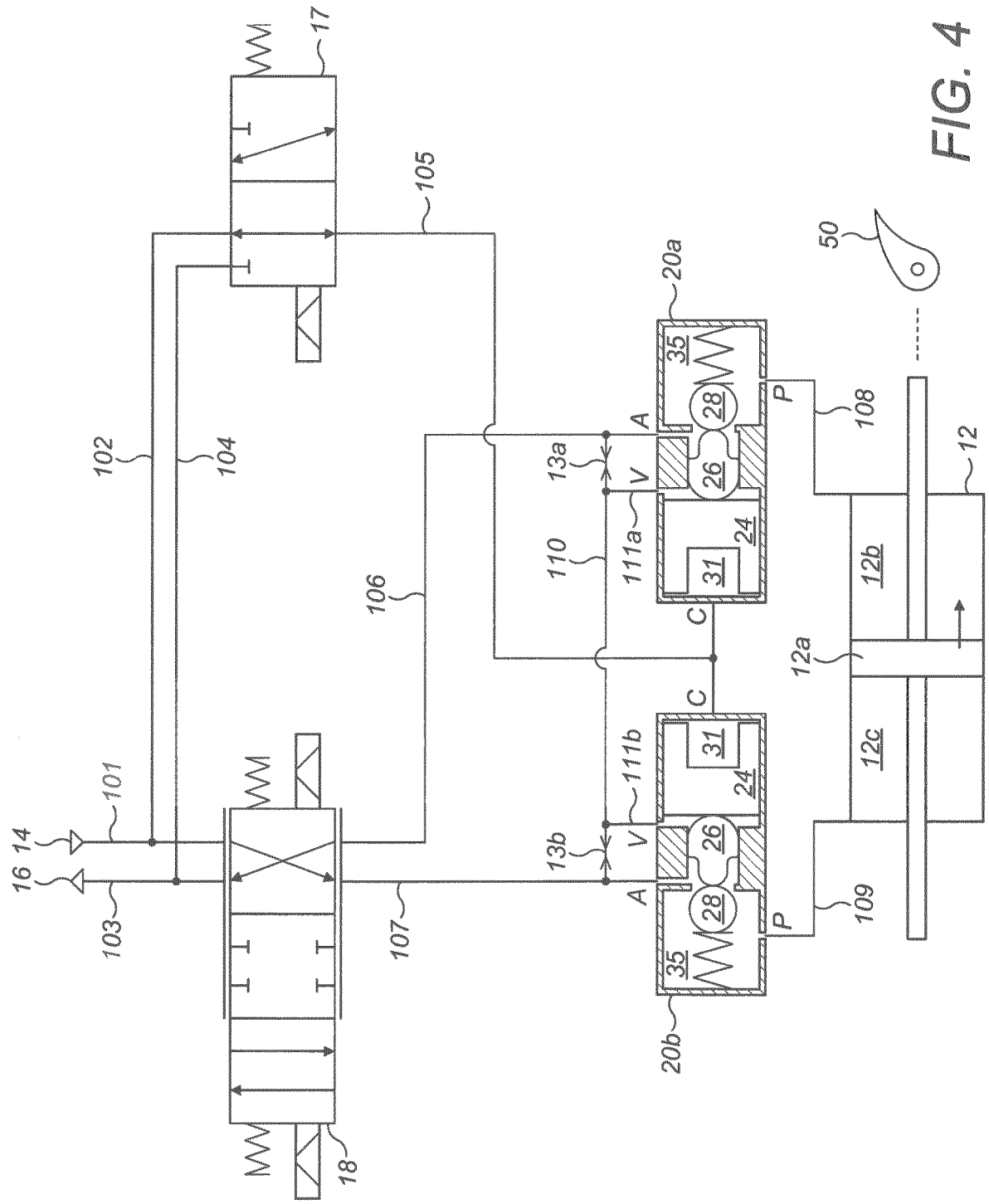
FIG. 4 shows the arrangement of FIG. 1 in position to drive the actuator piston to the right.

To retract the piston 12a (i.e. to move the hydraulic actuator 12 in the right direction as shown in FIG. 4), a negative command current may be provided to the servovalve 18 to cause a displacement of the spool of the servovalve 18 to the position shown in FIG. 4. This results in flow from the supply 14 to the actuator chamber 12c via the seventh line 107, the second hydraulic no-back device 20b, and the ninth line 109. At the same time, the servovalve 18 allows flow from the actuator chamber 12b to the return 16 via eighth line 108, the first hydraulic no-back device 20a, and the sixth line 106.

The construction of the hydraulic pilot no-back devices 20a, 20b will now be described in more detail with reference to FIG. 2. The hydraulic pilot no-back devices 20a, 20b are identical in their mode of operation, and thus may be referred to as hydraulic pilot no-back device 20, on the understanding that this applies to each of the hydraulic pilot no-back devices 20a, 20b individually.

The hydraulic pilot no-back device 20 comprises a sleeve 22 (or housing) which contains: a pilot piston 24, a plunger 26, a shutter 28, a shutter guide element 30, a spring 32, and a ring 34, all of which are contained within the sleeve 22. In this particular example, located on the outside of the sleeve 22 are four O-rings 36 that serve to fluidly isolate the various ports C, A, V, and P from one another on the outside of the hydraulic pilot no-back device 20.

The pilot piston 24 is free to move, within a pilot piston chamber 31, under the effect of pressure applied by the supply 14 at the pilot port C. The piston chamber 31 comprises both the pilot port C, for receiving fluid into the chamber 31 from the power module 14 and the vent port, V, for allowing fluid to flow out of the fluid chamber 31. The piston 24 is positioned so that the vent port V and the pilot port C are at opposite sides, or ends, 24a, 24b of the piston 24.

The ring 34 may be positionally fixed within the sleeve 22 and one end of the spring 32 abuts the ring 34. The other end of the spring 32 abuts the shutter guide element 30; therefore it presses the shutter 28 against the port 33. The control port A is provided in a separate section of the no-back device 20 a, b, that is positioned between the piston chamber 31 and the chamber 35. The chamber 35 is in fluid communication with the port P. When the port 33 is plugged via the shutter 28, fluid may therefore not flow through the hydraulic pilot no-back device 20 from the control port A to the actuator chamber port P and vice versa. When the port 33 is unplugged (as is shown in FIG. 2), fluid may flow freely between the control port A and the actuator chamber port P.

The axial position of the ring 34 can be individually set for a given hydraulic pilot no-back device 20. The position allows adjustment of the spring preload, and therefore of the forces required to open the hydraulic pilot no-back device 20.

Due to the spring 32 biasing the shutter 28 into the port 33, the default state of the hydraulic pilot no-back device 20 is to be closed (i.e. to prevent fluid flow between the control port A and the actuator chamber port P and vice versa) when no pressure is applied to the pilot port C. When increased pressure is applied to the pilot port C, the pilot piston 24 moves within the pilot piston chamber 31 and bears against the plunger 26 which, in turn, bears against the shutter 28 so as to oppose the spring 32 force. This action pushes the shutter 28 away from the port 33 which thus allows fluid flow between the control port A and the actuator chamber port P and vice versa. Pressure in the pilot port C may come directly from the supply 14 via the solenoid valve 17 (i.e. with no deliberate pressure reduction, such as a restrictor orifice, between the supply 14 and the pilot piston 24).

As described above, a first end 24a, or side, of the pilot piston 24, is in fluid communication with the vent port V. The vent port V is therefore a fluid outlet that is positioned and provided to extend through the wall of the pilot piston chamber 31 at the end 24a, or side, of the pilot piston 24, that is opposite to the end 24b, or side, of the pilot piston 24 that is in fluid communication with the pilot port C, as shown in FIG. 2. That is, the pilot piston 24 is positioned so as to extend within the piston chamber 31 between these two ports, V and C of the piston chamber 31, with each port being provided within the chamber 31 at either end 24a, 24b, or side of the pilot piston 24. Thus, when the pilot piston 24 moves within the pilot piston chamber 31, in response to pressure being provided from the supply 14, the vent port V allows fluid to flow into/out of the pilot chamber 31, as required, to allow movement of the pilot piston 24 within the chamber 31.

In known check valves, the pressure ratio between the control pressure C and the actuator chamber port pressure P is typically in the range of 2:1 to 4:1. Therefore, in order to allow flow from control port A to actuator chamber port P, the pressure in the control port C must be at least double the pressure at the actuator chamber port P.

In the new hydraulic devices described in the present disclosure, however, the relationship between the areas of the various components have been specifically designed in order to guarantee the opening of the hydraulic pilot no-back device 20 regardless of the pressure ratio between the pilot port C and the pressure at the actuator chamber port P. The fundamental technical characteristic that allows this improvement is the management of the pressures in the vent ports V.

The features of the vent ports V and their associated components will therefore now be described in detail. The vent port V allows fluid into/out of the pilot piston chamber 31 on the opposite end, or side 24a, of the pilot piston 24 to the pilot port C. The required fluctuation of the flow contained therein is ensured by directly connecting the vent ports V of both hydraulic pilot no-back devices 20 together, by the tenth line 110 and its branch lines 111a,111b, and further by placing both vent ports V in connection with the two control ports C through calibrated orifices 13a and 13b.

In normal operation, the pressures in the vent ports V are identical in both hydraulic pilot no-back devices 20a, 20b. This is also at a lower pressure than fluid entering the pilot port C and is always equal to the half difference between the supply and return pressures.

The pressure in the vent port V also performs a damping function by reducing the speed of movement of the pilot piston 24. This limits the formation of pressure peaks. The effect of damping can be controlled in the design phase by varying the area of calibrated orifices 13a and 13b. A larger area for each orifice 13a,13b reduces the damping effect and, conversely, a narrower passage increases the damping effect.

In known hydraulic applications, the vent port V is normally connected to the hydraulic return 16 through a drain line. Such solutions require the use of additional hydraulic ducts in order to connect the vent port V to the return 16. In the present disclosure, the hydraulic pilot no-back devices 20a and 20b could readily be retrofitted to systems with distributed manifolds or to systems with single manifolds, since the present arrangement does not require oil drain line.

Figure 2:
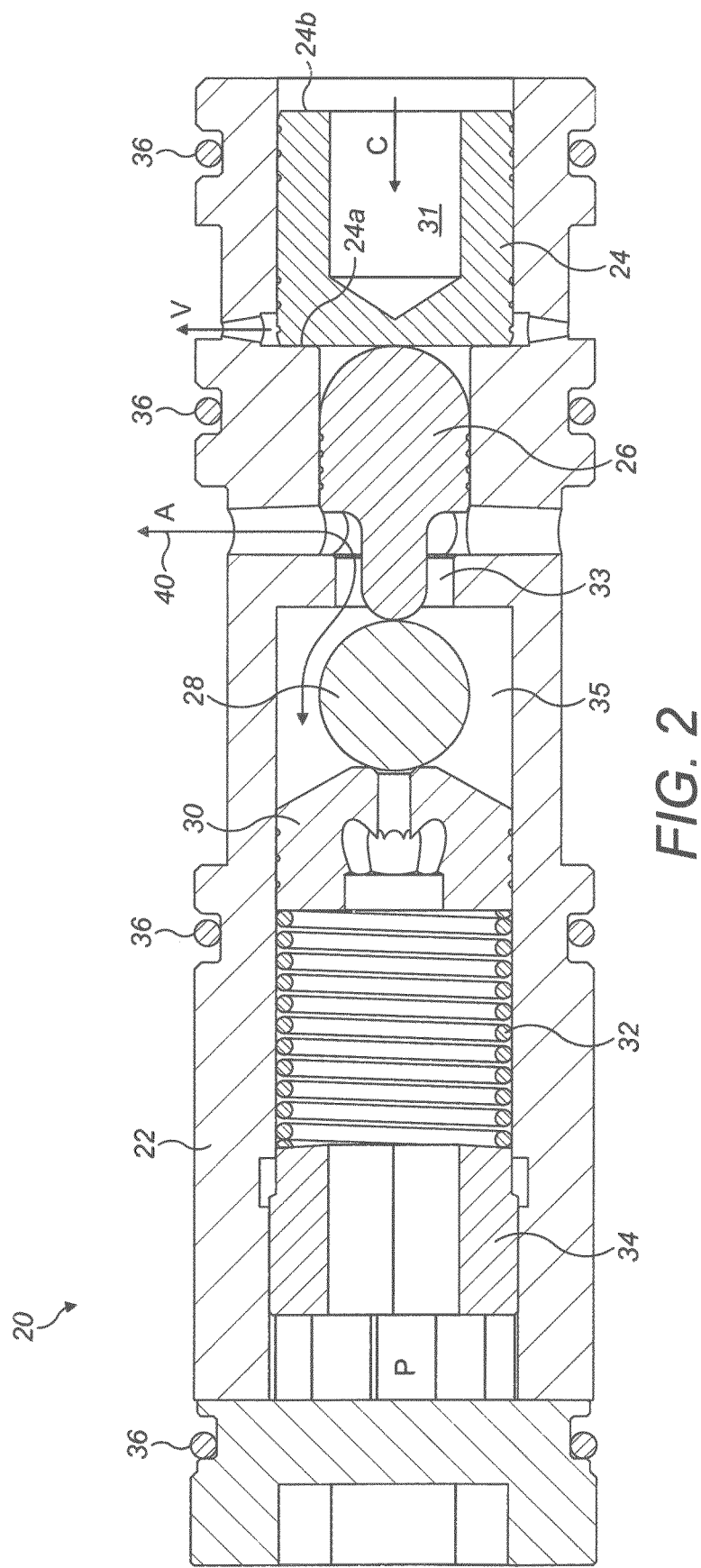
FIG. 2 shows a check-valve as used in the arrangement of FIG. 1.

In the position shown in FIG. 2, hydraulic pressure is being applied to the pilot port C, pushing the pilot piston 24 to the left in the orientation shown in FIG. 2. This pushes the plunger 26 to the left, which pushes the shutter 28 to the left, and which allows fluid flow between the control port A and the actuator chamber port P, as depicted by the arrow 40.

As noted above, and shown in FIG. 4, hydraulic pressure may be applied to the pilot port C from the supply 14, via second line 102, via the (open) solenoid valve 17, and via line 105.

When the solenoid valve 17 is closed or when hydraulic failure occurs, the hydraulic pressure is no longer delivered to the pilot port C. In this case, the spring force from the spring 32 will urge the shutter to the right in FIG. 2. As soon as the pressure in the pilot chamber 31 falls below the cracking pressure, the spring load is no longer counteracted by the pressure force from the pilot piston that moves the plunger 26. This movement will urge the plunger 26 to the right and will move the pilot piston 24 within the pilot piston chamber 31. This movement of the pilot piston 24 within the pilot piston chamber 31 is allowed because the pilot piston 24, under the effect of the spring force, will gradually force fluid out of the pilot piston chamber 31 though the pilot port C.

Hydraulic fluid pressure in the vent port V acts against hydraulic pressure in the pilot port C. Thus, an excessively high pressure at the vent port V can act to move the pilot piston 24 away from the shutter 28 such that the shutter 28 may close the check valve 20 under bias from the spring 32. As described in detail below, this vent port V and its fluid connections to the tenth line 110 and the restrictor orifices 13a,b is the mechanism by which the opening of each of the hydraulic pilot no-back devices 20a, 20b can occur regardless of the ratio between the pressure at the device's control port A and the pressure in the chamber of the actuator 12 to which that hydraulic pilot no-back device connects.

Figure 5:
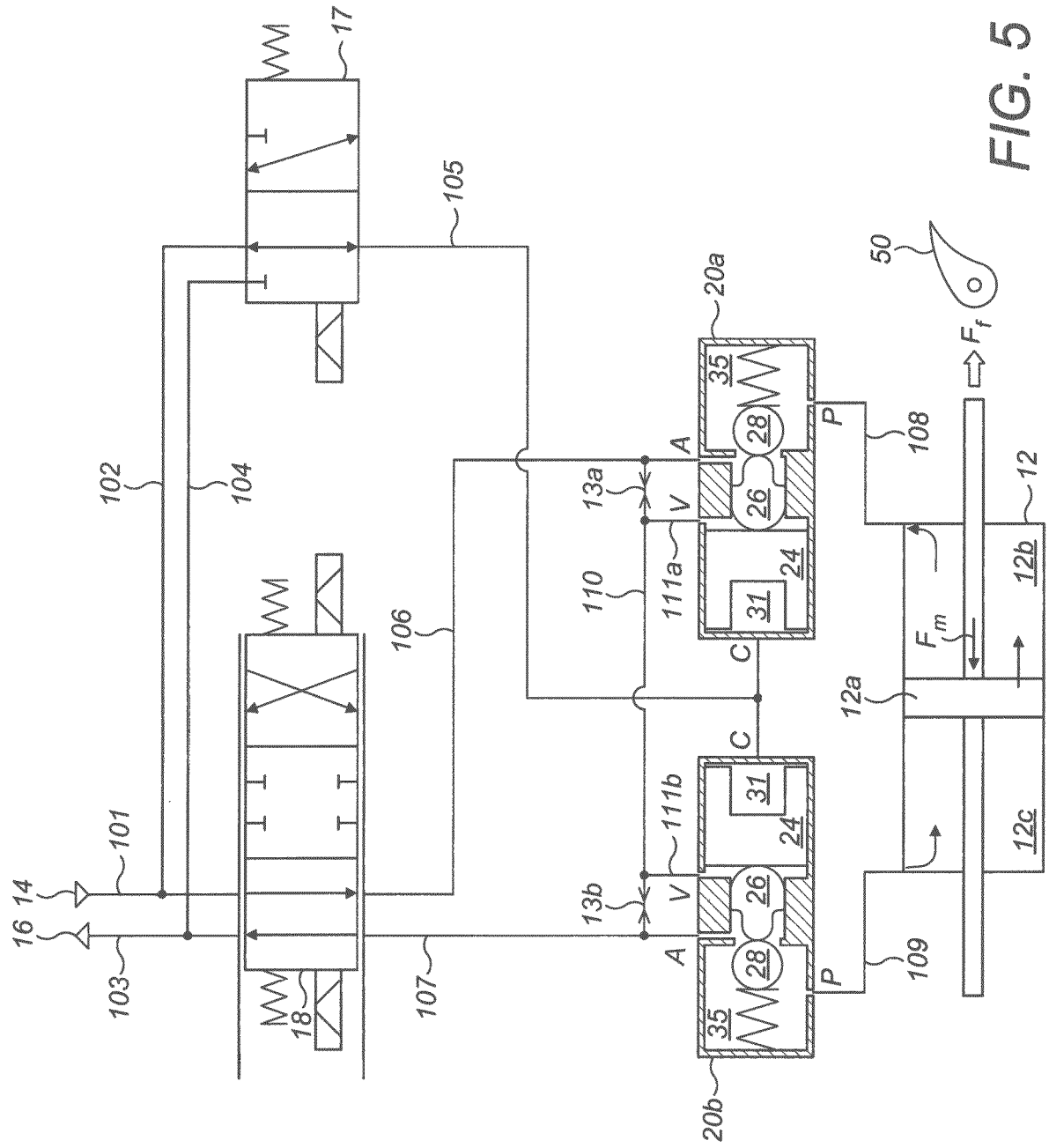
FIG. 5 shows the hydraulic arrangement arranged to drive the hydraulic actuator to the right while being counteracted by feedback forces.

In FIG. 5, under normal conditions, the arrangement 10 is configured to drive the actuator 12 to the left (as in FIG. 3), against the aerodynamic force Ff; however, due to failure of the hydraulic system the aerodynamic force Ff on the flap 50 is no longer effectively opposed by pressure forces in the actuator 12.

In absence of hydraulic pilot no-back devices 20, instead of fluid flowing from the control port A to the actuator chamber port P of the first check valve 20a, fluid actually flows the other way, as depicted by the arrows in the actuator chambers 12b,c, i.e. from the actuator chamber port P to control port A. In this case the actuator is subject to uncontrollable movements causing surface oscillations which could lead to loss of aircraft control.

In the arrangement of FIG. 5, that has hydraulic pilot no-back devices 20a, 20b, the sudden decrease of the supply pressure, due to failure of hydraulic system, results in the reduction of the control pressure in the chamber 24 under the cracking value. Then the spring load is no longer counteracted by the pressure force controlling movement of the plunger 26. The spring force also induces the shutter 28 to close against its port 33 and thus close the first check valve 20a. As a result of this automatic closure, when the aerodynamic forces act on the unpressurized hydraulic pilot no-back device 20a, the hydraulic pilot no-back devices 20a close and the first chamber 12b of the hydraulic actuator 12 can no longer be emptied and thus the hydraulic actuator 12 is locked closed.

Once the shutter 28 of a check valve 20 is closed (i.e. abutting its port 33) if there is higher pressure coming from the actuator chamber port P than coming from the control port A, the net pressure will assist in sealing the shutter 28 against its port 33, thus assisting the spring 32 in keeping the check valve 20 closed. Simultaneously, the second check valve 20b also closes, for the same reasons as the first check valve 20a.

In the event of aerodynamic load in the opposite direction to that described in the FIG. 5, the operation of the system is identical to that described above.

The above is a description of a hydraulic pilot no-back device for a hydraulic actuator 12. Various parts of the arrangement are optional or may be substituted for other parts. For example:

The solenoid valve 17 may be substituted by a manually operated three ways two positions valve.

The solenoid valve 17 may not be preset, C chambers will be connected directly to the supply. In this case the state of the hydraulic pilot no-back devices (open/close) cannot be controlled, but it will depend exclusively on the supply pressure.

The servovalve 18 may be substituted by a 4-ways distributor valve.

The servovalve 18 may be substituted by a DDV valve (direct drive valve).

The servovalve 18 may be substituted by any type of valve or combination of valves that allow to control the flow rate in the two chambers 12a, 12b of the actuator 12.

The hydraulic actuator 12 may be a balanced-area actuator (as shown in FIGS. 1 and 3-5).

The hydraulic actuator 12 may be a single rod actuator.

The ports V of the hydraulic pilot no-back devices may be connected through calibrate orifices directly to the supply 14 and return 16, instead of being connected to lines 106 and 107.

The spring 32 may be substituted by any type of compression spring.

The invention claimed is:

1. A system for moving a hydraulic actuator comprising:
   a hydraulic power module for pumping hydraulic fluid through said system to said actuator;
   a reservoir for receiving said fluid back from said system and said actuator;
   first and second check valves; and
   one or more conduits that fluidly connect the power module to said check valves and said reservoir;
   wherein the one or more conduits are connected so as to allow said hydraulic fluid to flow from the hydraulic power module to said first check valve, and from said first check valve into said hydraulic actuator, and from said hydraulic actuator to said second check valve and from said second check valve to said reservoir;
   wherein at least one of the first and second check valves comprises a housing having a first chamber and a second chamber, and a chamber port is provided between said first and said second chamber;
   wherein said first chamber has a pilot piston movably located within said first chamber; and wherein when said pilot piston is provided in a first position within said first chamber, said chamber port is closed, and wherein when said pilot piston is in a second position, said chamber port is open;
   wherein, said first chamber further comprises a pilot port (C) and a vent port (V);
   wherein said housing further comprises a control port (A) in fluid communication with said chamber port;
   wherein said second chamber comprises an actuator chamber port (P);
   wherein said vent port (V) of said first check valve is fluidly connected to said vent port (V) of said second check valve;
   wherein said vent port (V) of said first check valve is fluidly connected to said control port (A) of said first check valve via a restrictor orifice; and
   wherein said vent port (V) of said second check valve is fluidly connected to said control port A of said second check valve via a restrictor orifice.

2. The system of claim 1, wherein, when said pilot piston is in said first position and said chamber port is closed, said fluid is able to flow out of said vent port (V) of said first chamber, and fluid flow is prevented from flowing between said control port (A) and said actuator chamber port (P).

3. The system of claim 2, wherein when said pilot piston is in said second position and said chamber port is open, fluid is able to flow between the control port (A) and the actuator chamber port (P) and vice versa.

4. The system of claim 1, wherein said vent port (V) of said second check valve is fluidly connected to said control port (A) of said second check valve via a restrictor orifice.

5. The system of claim 1, wherein said hydraulic actuator comprises first and second fluid chambers; and wherein the one or more conduits are connected so as to allow said hydraulic fluid to flow from said first check valve to said first fluid chamber and from said second fluid chamber to said second check valve.

6. The system of claim 5, wherein said first and second check valves comprise hydraulic pilot operated no-back devices.

7. The system of claim 1, wherein said control port (A) is in selective fluid communication with the power module or the reservoir, and wherein
   said actuator chamber port (P) is in fluid communication with a chamber of the hydraulic actuator; and each of said check valves comprising:
   a movable shutter for selectively preventing fluid flow between the control port A and the actuator chamber port (P).

8. The system of claim 7, wherein each check valve has a substantially cylindrical geometry; and
   wherein, in each check valve, a generally cylindrical chamber connects said control port (A) to said actuator chamber port (P), the cylindrical chamber having a chamber diameter, and wherein the pilot piston has a diameter, and wherein the chamber diameter is within 10% of the piston diameter.

* * * * *